United States Patent
Wang

(10) Patent No.: US 6,694,917 B1
(45) Date of Patent: Feb. 24, 2004

(54) FEEDING APPARATUS

(75) Inventor: Chiao-Ming Wang, Taichung Hsien (TW)

(73) Assignee: Meiko Pet Corporation, Taichung Hsien (TW)

( * ) Notice: Subject to any disclaimer, the term of this patent is extended or adjusted under 35 U.S.C. 154(b) by 0 days.

(21) Appl. No.: 10/446,129

(22) Filed: May 28, 2003

(51) Int. Cl.[7] .......................... A01K 61/02; A01K 5/00
(52) U.S. Cl. ................................ 119/51.11; 119/51.04
(58) Field of Search ..................... 119/51.01, 51.04, 119/51.11

(56) References Cited

U.S. PATENT DOCUMENTS

| | | | |
|---|---|---|---|
| 4,279,220 A | * 7/1981 | Kukurba | 119/51.11 |
| 5,003,925 A | * 4/1991 | Roberts | 119/51.04 |
| 5,299,529 A | * 4/1994 | Ramirez | 119/51.11 |
| 5,873,326 A | * 2/1999 | Davet et al. | 119/51.11 |
| 6,427,628 B1 | * 8/2002 | Reece | 119/51.11 |
| 6,487,987 B1 | * 12/2002 | Choi | 119/51.11 |
| 6,622,655 B2 | * 9/2003 | Springett | 119/51.01 |

* cited by examiner

Primary Examiner—Charles T. Jordan
Assistant Examiner—Elizabeth Shaw
(74) Attorney, Agent, or Firm—Troxell Law Office PLLC

(57) ABSTRACT

A feeding apparatus and particularly a feeding apparatus capable of feeding pet fish or pets randomly or at a selected time interval. It includes a case and a control dock housed in the case. A first control button and a second control button are provided to selectively activate the motor on the control dock to operate at a selected time interval or randomly, thereby a feed box is driven to rotate synchronously. When the feed discharge outlet faces downwards, feeds are poured into a tank to feed the pet fish or pets. The control dock also has a main gear which has an axle coupling with a cam. The cam will trigger a microswitch to stop motor operation when reaches a selected location to achieve timer or random feeding for the pet fish or pets.

7 Claims, 7 Drawing Sheets

FEEDING APPARATUS

BACKGROUND OF THE INVENTION

1. Field of the Invention

The invention relates to a feeding apparatus and particularly to a feeding apparatus that is capable of feeding pet fish or pets at a selected time interval or randomly.

2. Description of the Prior Art

Conventional feeding devices generally can be grouped in two types based on the feeding control method. One is random control and another is electronic timer control. The former feeding device 1 (referring to FIG. 1) mainly includes a feed container 11 on an upper portion of a device case. It has a control button 111, an operation mechanism 12 in the middle portion and a funnel type passage 13 at the lower portion leading to a discharge outlet 14. For feeding, depress the control button 111 to activate the operation mechanism 12, feeds drop from the feed container 11 through the funnel type passage 13 and are discharged through the discharge outlet 14. Such type of feeding device 1 has a big disadvantage, i.e. cannot set feeding time in advance. The electronic feeding device is developed to remedy this problem. The construction of the electronic feeding device is largely like the random feeding device. The main difference is that it includes a timer control circuit to preset time. However setting timer for such type of electronic feeding device is as complex as setting a time clock. It is inconvenient to many users.

SUMMARY OF THE INVENTION

In view of the aforesaid disadvantages, the object of the invention is to provide a simple feeding apparatus that may be operated randomly or at a selected time interval. The timer can be set by simply depressing a control button to switch to a selected time stage. It is simple and easy to use.

In order to achieve the object set forth above, the feeding apparatus of the invention includes case, a control dock housed in the case, and a first control button and a second control button to drive a motor located on the control dock to operate at a selected time interval or randomly. A feed box is driven and rotates synchronously. When the discharge outlet faces downwards, feeds in the feed container are poured into a tank where the pet fish or pets are living. The control dock has a main gear with an axle coupling with a cam which triggers a microswitch to stop motor operation when a selected location arrives. Thus the pet fish or pets may be fed at the selected time interval or randomly as desired.

In one aspect of the invention, two control buttons are provided. A first control button is for random control of feeding. A second control button is for multi-stage switch selection. Each stage has a preset time period made at the plant without the need of users to input setting value. For instance, a first stage is twelve hours, and a second stage is twenty four hours. Depending on feeding time requirement of the pets (or fish), a desired time stage may be selected without users to go through complicated input operations to set the timer. Thus it is convenient to operate and use.

In another aspect of the invention, the control dock includes a motor which is activated by the first control button to perform random operation and activated by the second control button to perform staged operation at a selective time interval. The circuit board has a timer which may be switched to a selected time stage through the second control button to activate motor operation. When the motor is activated by the first or second control button and operates, the worm on the motor shaft drives a gear set which has a main gear to drive the feed box synchronously and complete a feeding operation in each rotation. The axle of the main gear is coupled with a cam to trigger a microswitch to cut off electric power supply and stop motor operation.

In yet another aspect of the invention, the discharge outlet of the feed box has an arched passage. When the feed box is driven by the motor and turns, feeds slide through the discharge outlet. The arched passage has two arched clamp plates located on the inner side to form an arched trough to house an adjusting plate to control discharge quantity of the feeds.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
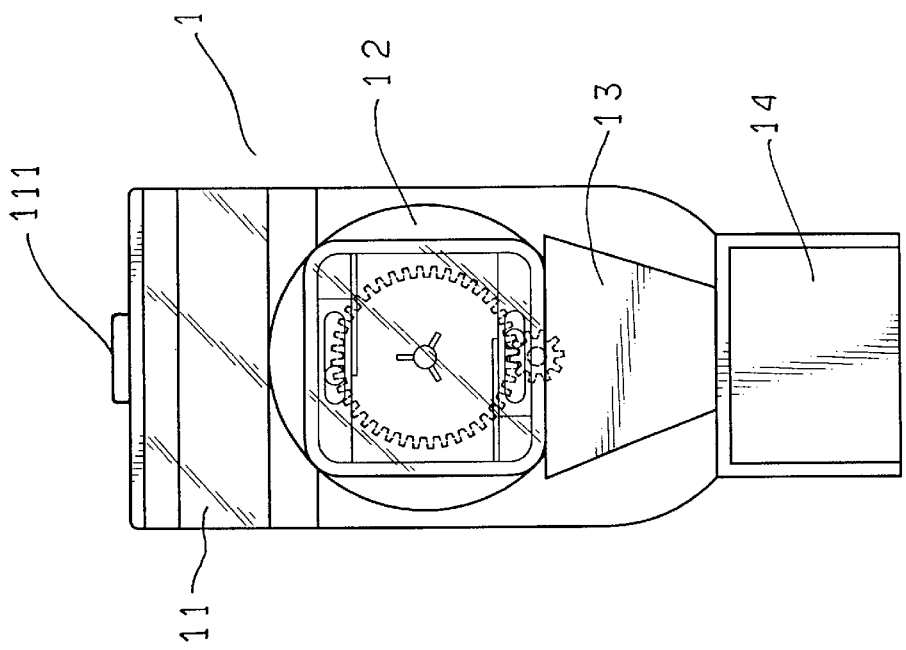
FIG. 1 is a schematic view of a conventional feeding device.
Figure 2:
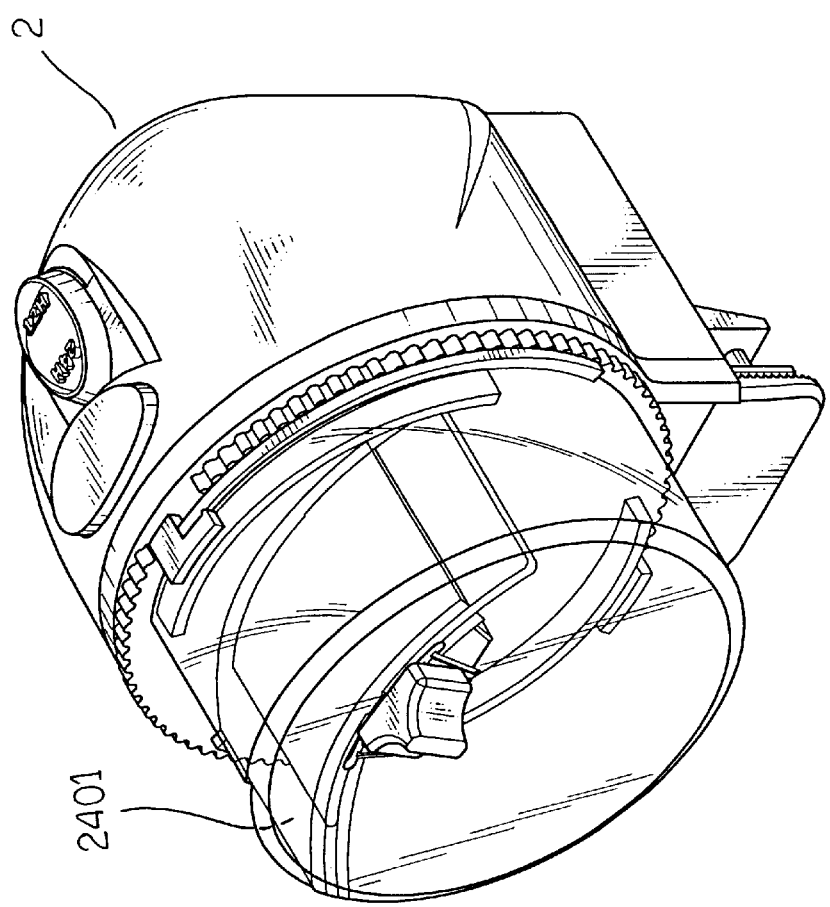
FIG. 2 is a perspective view of the invention.
Figure 3:
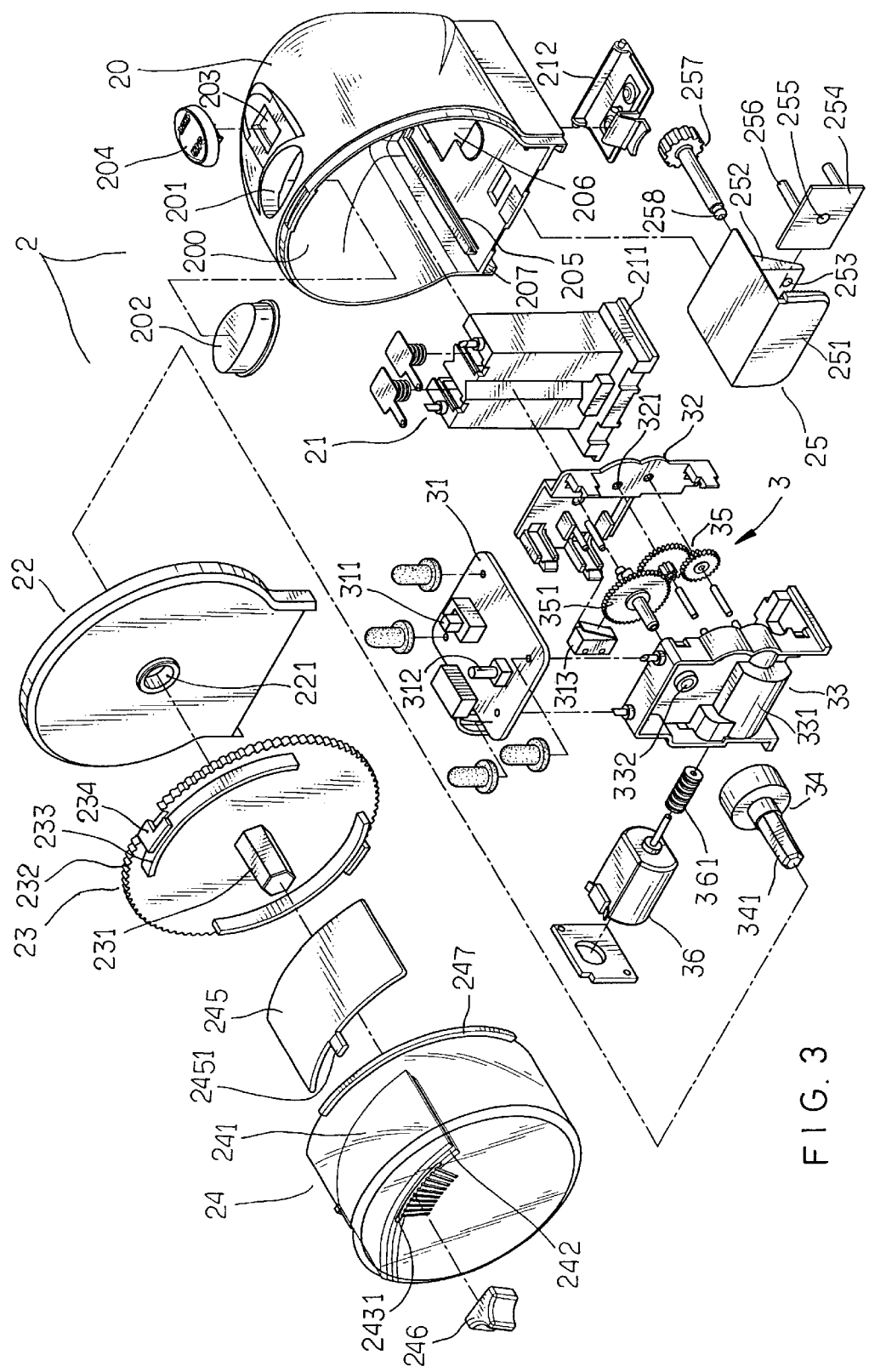
FIG. 3 is an exploded view of the invention.
Figure 4:
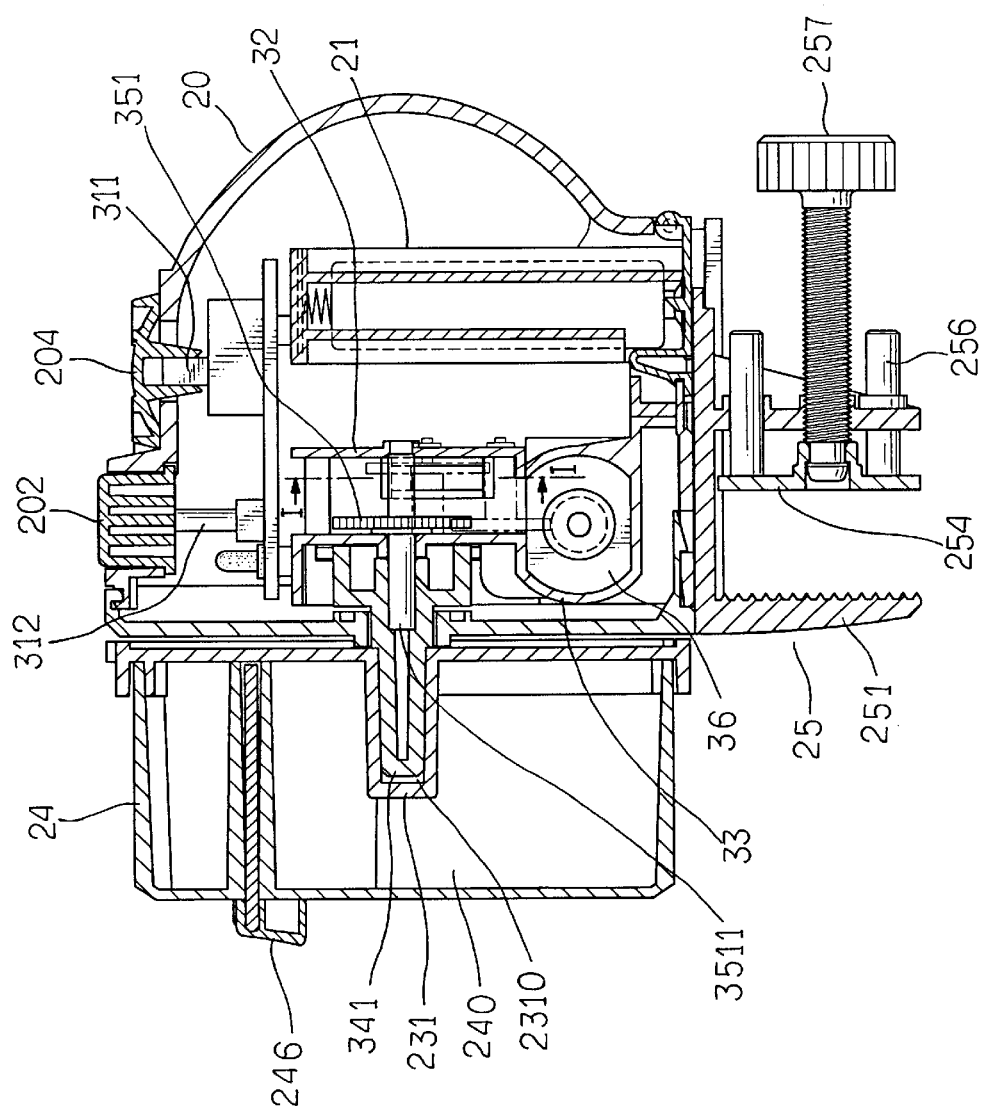
FIG. 4 is a sectional view of the invention.

Referring to FIGS. 2, 3 and 4, the invention includes a case 2 which houses a control dock 3.

Figure 5:
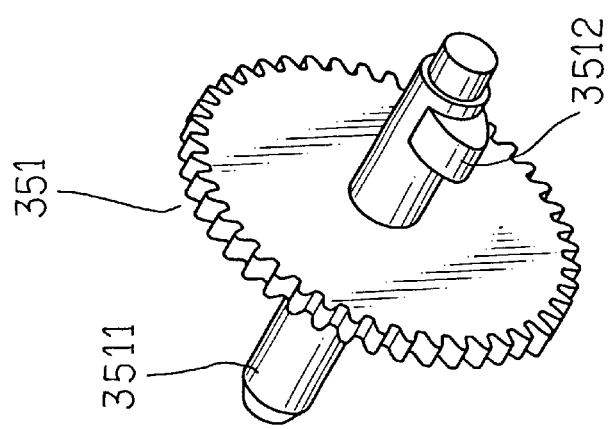
FIG. 5 is a perspective view of the main gear of the invention.
Figure 9:
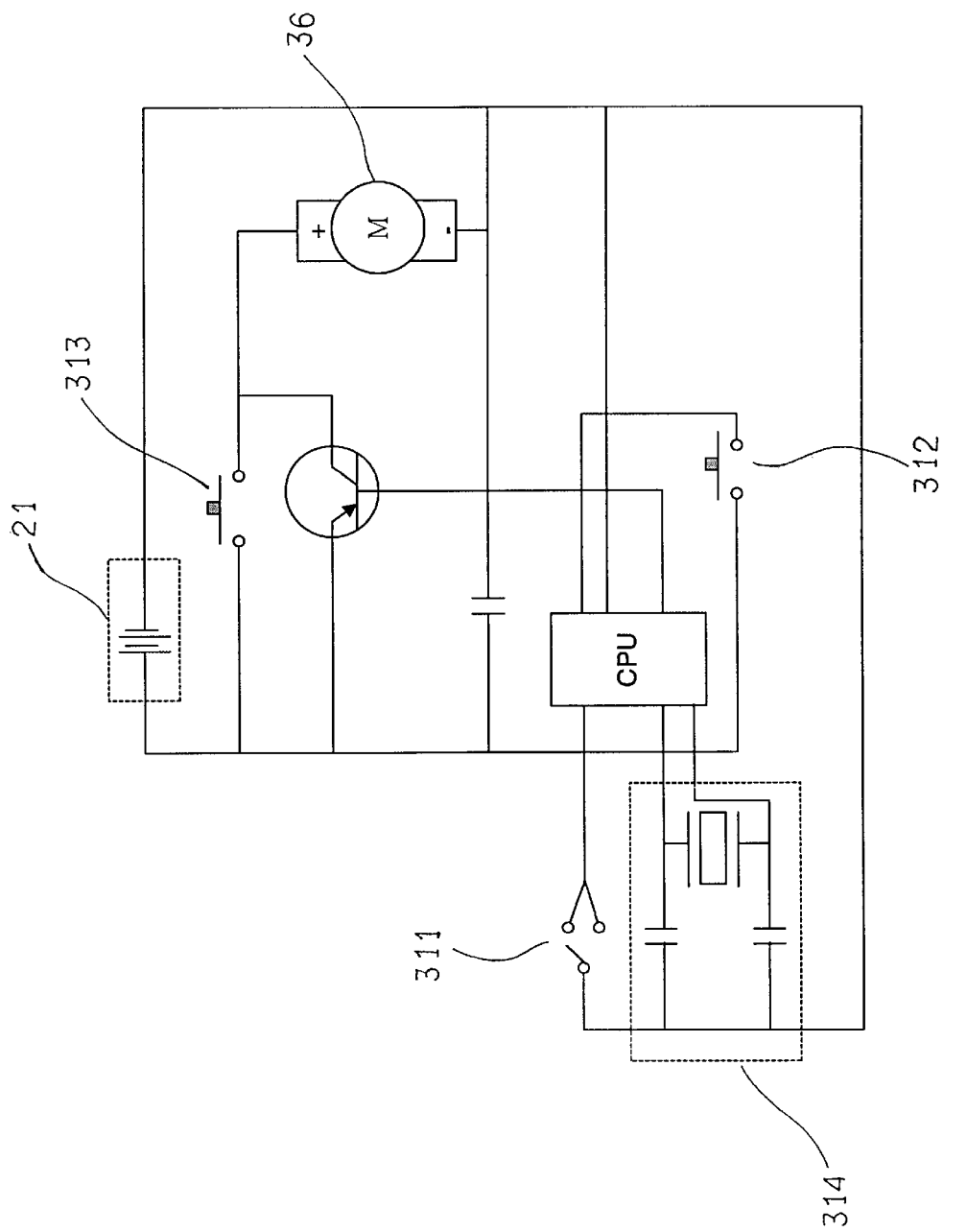
FIG. 9 is a control circuit diagram of the invention.

The case 2 includes:

- a base dock 20 which has an opening on the front side, a hollow housing chamber 200 in the interior, a top section having a first opening 201 to hold a first control button 202 and a second opening 203 to hold a second control button 204, and a bottom side having two parallel tracks 205 to receive two side flanges 211 of a battery cartridge 21 and a lid opening 206 to be covered by a battery lid 212. The bottom section of the bottom dock 20 is coupled with a clamp seat 25 which has a clamp board 251 with one end wedging into an anchor trough 207 formed on the bottom dock 20. The clamp seat 25 has an anchor plate 252 located behind the clamp board 251 with three apertures 253 formed thereon to receive two guiding rods 256 of a movable plate 254 and a fastening bolt 257. The fastening bolt 257 has a front end forming a tip 258 of a smaller diameter to couple with an insert hole 255 formed on the movable plate 254 to move the movable plate 254 forwards or rearwards;
- a front lid 22 covering the front opening of the base dock 20 and having an axle hole 221 in the center;
- a bottom disk 23 having a teeth rim 232 on the peripheral edge and a polygonal main axle sleeve 231 in the center with a polygonal inner hole 2310 formed therein, and two arched ribs 233 on the disk surface opposing each other. Each arched rib 233 has a retaining rib 234 located on an outer side thereof;

a feed box 24 having a bottom section with a hollow compartment 240 which has an opening, an arched flange 247 on the front rim, and a discharge outlet 2401 which has an arched passage 2402 (also referring to FIG. 7) containing two arched clamp plates 2411 and 2412 to form an arched trough 242 to house an adjusting plate 245. The adjusting plate 245 has a lug 2451 located on a side edge to extend outside of an arched slot 2431 formed on a front side 243 of the feed box 24. The lug 2451 is coupled with a control key 246. The lower rim of the arched slot 2431 has a mark scale 2432;

the control box 3 includes:

a circuit board 31 which contains a control circuit (referring to FIG. 9, which is a conventional circuit known in the art). The circuit includes a first switch 312, a second switch 311, a microswitch 313 and a timer 314;

a left member 33 and a right member 32 opposing each other to couple with the circuit board 31 to form the body of the control dock 3;

a motor 36 mounted onto a motor seat 331 on the left member 33 of the control dock 3 having a shaft coupling with a worm 361; and a gear set 35 consisting of a plurality of gears that include a main gear 351 which has an axle 3511 with an outer section running through an axle hole 332 located on the left member 33 to couple with an axle sleeve 34. The axle sleeve 34 has one end forming a polygonal shaft 341. The axle 3511 of the main gear 351 has an inner section pivotally coupling with a cam 3512 (referring to FIG. 5).

By means of the construction set forth above, when in use, first clamp the clamp seat 25 on the upper rim of a tank 4, and adjust discharge amount of feeds 5 through the control key 246 (adjusting by referring to the mark scale 2432); next, pour the feeds 5 into the feed box 24 and couple the bottom disk 23, and couple the arched flange 247 of the feed box 24 on the outer side of the arched ribs 233 of the bottom disk 23, and turn the feed box to latch on retaining rib 234 to anchor the feed box 24 on the bottom disk 23; then couple the inner hole 2310 of the axle sleeve 231 to the shaft 341 of the axle sleeve 34 to complete the feed assembly. When in use for random feeding operation, depress the first control button 202 to trigger the first switch 312 and activate the control circuit to set the power supply ON for driving the motor (detailed operation will be discussed later). For setting timer feeding operation, first, switch the time stage of the second control button 204 (according to the selected time stage, such as the first stage is twelve hours, and the second stage is twenty four hours); the second switch 311 is activated by the second control button 204 and may be moved synchronously to switch to the setting time stage; when the set time arrives, the control circuit is activated to turn on the power supply and activate the motor 36.

Figure 6:
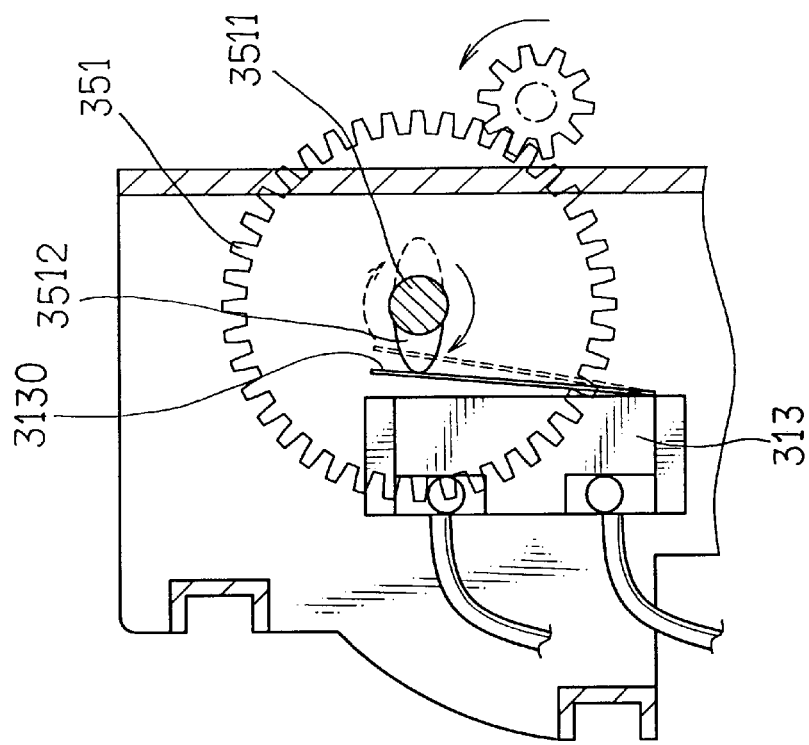
FIG. 6 is a cross section taken on line I-I in FIG. 4.
Figure 7:
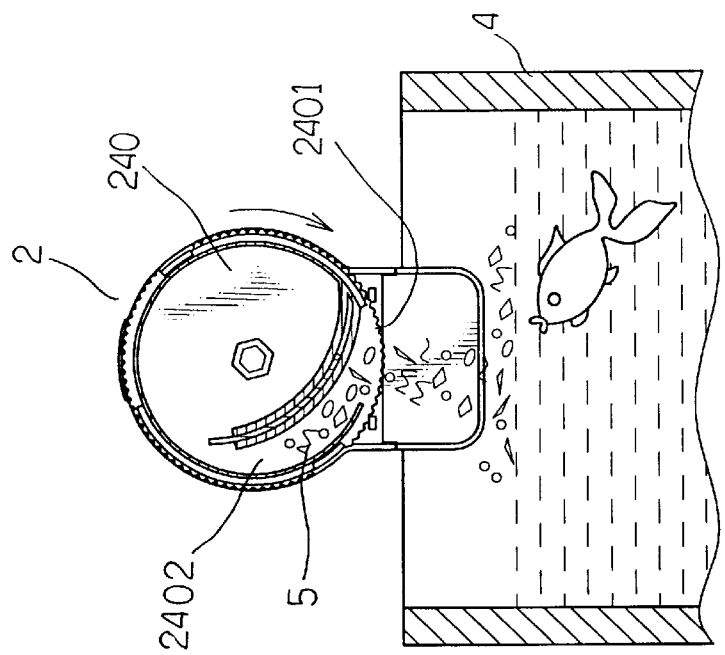
FIG. 7 is a schematic view of the invention in an operating condition.
Figure 8:
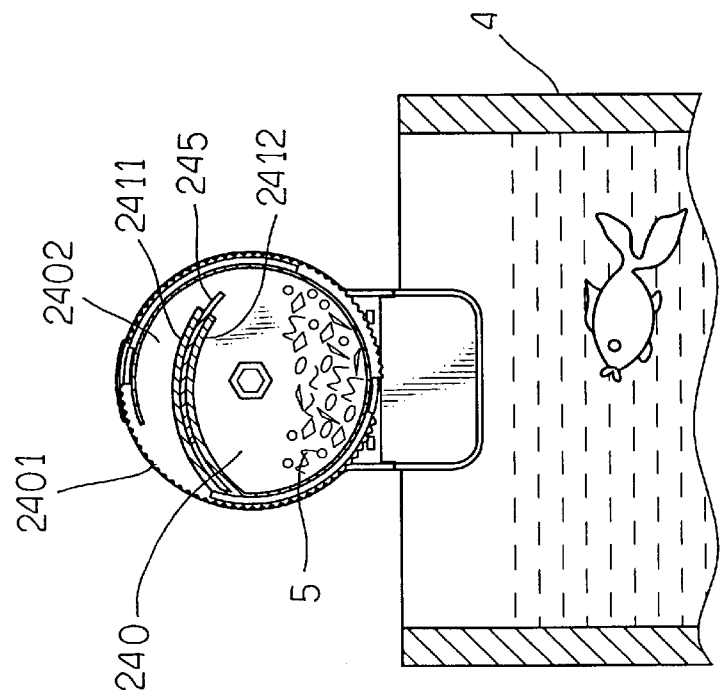
FIG. 8 is a schematic view of the invention in another operating condition.

In the two operation modes set forth above, when the motor 36 starts operation, the gear set 35 is also being driven to operate. The axle 3511 of the main gear 351 synchronously drives the axle sleeve 34, bottom disk 23 and feed box 24 to rotate. Feeds 5 may slide through the arched passage 2402. When the feed outlet 2401 faces downwards, the feeds 5 drop into the tank 4 (as shown in FIGS. 7 and 8). Upon turning one round, the cam 3512 mounted on the axle 3511 of the main gear 351 triggers a depressing lever 3130 of the microswitch 313 (as shown in FIG. 6), the power supply to the motor 36 is cut off and operation stops to complete one cycle of feeding operation.

The feeding apparatus of the invention provides random feeding or timer feeding, and feeding time and stage may be selected and set quickly. Operation is simple and convenient.

I claim:

1. A feeding apparatus comprising a case and a control dock housed in the case, wherein:

the case includes:
a base dock having an opening on a front side, a hollow housing chamber in the interior, a top section having a first opening to hold a first control button and a second opening to hold a second control button;
a front lid covered the opening at the front side of the base dock having an axle hole in the center;
a bottom disk having a polygonal main axle sleeve in the center with a hole formed therein; and
a feed box having a bottom section which has a hollow compartment with an opening and an arched flange on a peripheral rim thereof;

the control dock includes:
a circuit board having a control circuit which includes a first switch, a second switch, a microswitch and a timer;
a left member and a right member opposing each other to couple with the circuit board to form a body of the control dock;
a motor mounted onto the control dock having a shaft coupling with a worm; and
a gear set consisting of a plurality of gears that include a main gear which has an axle with an outer section running through an axle hole located on the left member to couple with an axle sleeve, the axle sleeve having one end forming a polygonal shaft, the axle of the main gear having an inner section pivotally coupling with a cam.

2. The feeding apparatus of claim 1, wherein the base dock has a bottom side which has two parallel tracks to receive two side flanges of a battery cartridge.

3. The feeding apparatus of claim 1, wherein the base dock is coupled with a clamp seat.

4. The feeding apparatus of claim 1, wherein the bottom disk has a teeth rim on the peripheral edge thereof.

5. The feeding apparatus of claim 1, wherein the hole in the main axle sleeve of the bottom disk is polygonal.

6. The feeding apparatus of claim 1, wherein the feed box has a discharge outlet which has an arched passage containing two arched clamp plates to form an arched trough to house an adjusting plate.

7. The feeding apparatus of claim 1, wherein the bottom disk has two arched ribs on the disk surface opposing each other, each arched rib having a retaining rib located on an outer side thereof.

* * * * *